(12) United States Patent
Chiu

(10) Patent No.: US 6,418,880 B1
(45) Date of Patent: Jul. 16, 2002

(54) FLUSH TOILET FOR DOMESTIC PETS

(76) Inventor: Chui-Wen Chiu, 9 Nordic Place North York, Toronto (CA), M3A 2H8

( * ) Notice: Subject to any disclaimer, the term of this patent is extended or adjusted under 35 U.S.C. 154(b) by 0 days.

(21) Appl. No.: 09/740,984

(22) Filed: Dec. 21, 2000

(51) Int. Cl.[7] .............................................. A01K 29/00
(52) U.S. Cl. ..................................... 119/162; D30/161
(58) Field of Search ................................ 119/161, 162; D30/161

(56) References Cited

U.S. PATENT DOCUMENTS

| 3,890,931 | A | * | 6/1975 | Saver | 119/161 |
| 3,921,582 | A | * | 11/1975 | Sedllmeir | 119/161 |
| 4,271,544 | A | * | 6/1981 | Hammond | 119/162 |
| D271,435 | S | * | 11/1983 | Kullenback | 119/162 |
| 5,216,979 | A | * | 6/1993 | Salle et al. | 119/162 |
| 5,622,139 | A | * | 4/1997 | Rymer | 119/162 |
| 6,145,475 | A | * | 11/2000 | Jackson | 119/162 |

* cited by examiner

Primary Examiner—Charles T. Jordan
Assistant Examiner—Elizabeth Shaw

(57) ABSTRACT

Cats are generally well liked in our society. At one time cats were raised for the sole purpose for catching mice in order to protect food stuffs and for preventing the spread of deceases. Nowadays, cats are even more reverent as pets since they provide companionship to the owners. For these reasons, they are important members of our society and their well being and health are closely related to ours. The present invention provides a flush toilet for removing excrement from pets such as cats and dogs so as to preserve the well being of the environment and to reduce medical expenses due to the unsanitary condition created by such excrement if not removed.

4 Claims, 5 Drawing Sheets

FLUSH TOILET FOR DOMESTIC PETS

FIELD OF INVENTION

This invention relates to toilets for household pets and more particularly relates to a flush toilet for use by domestic pets such as cats and dogs.

BACKGROUND OF THE INVENTION

One problem of raising household pets is the disposal of their excrements. Litter boxes are commonly used as toilet facilities for domestic pets particularly for cats. The litter box is filled with absorbent granules or sand which serve to absorb the urine and the fluid matters in the feces and to provide covering over these excrements to reduce their foul smell from permeating the indoor atmosphere as well as to conceal their sight. The absorbent granule or sand saturated with feces and urine must be disposed of and the litter box is cleaned and refilled with fresh granules or sand frequently in order to maintain the sanitary condition of litter box and the indoor atmosphere. The maintenance of such toilet facility is problematic since the absorbent granules or sand does not eliminate the smell of the feces and urine so that the foul smell of the feces and urine excrements often permeates and contaminates the indoor air throughout the entire house. Furthermore, the chore of disposing the feces and urine saturated absorbent granules or sand is rather unpleasant and troublesome to carry out.

SUMMARY OF THE INVENTION

It is a principal object of the present invention to provide an accessory which may be incorporated in a conventional flush toilet such that it may be used by the domestic pets.

It is another object of the present invention to provide a flush toilet which may be used by domestic pets of various sizes.

It is another object of the present invention to provide an accessory having a simple construction and may be incorporated conveniently in a conventional flush toilet for use by domestic pets.

DETAILED DESCRIPTION OF THE PREFERRED EMBODIMENTS

Figure 1:
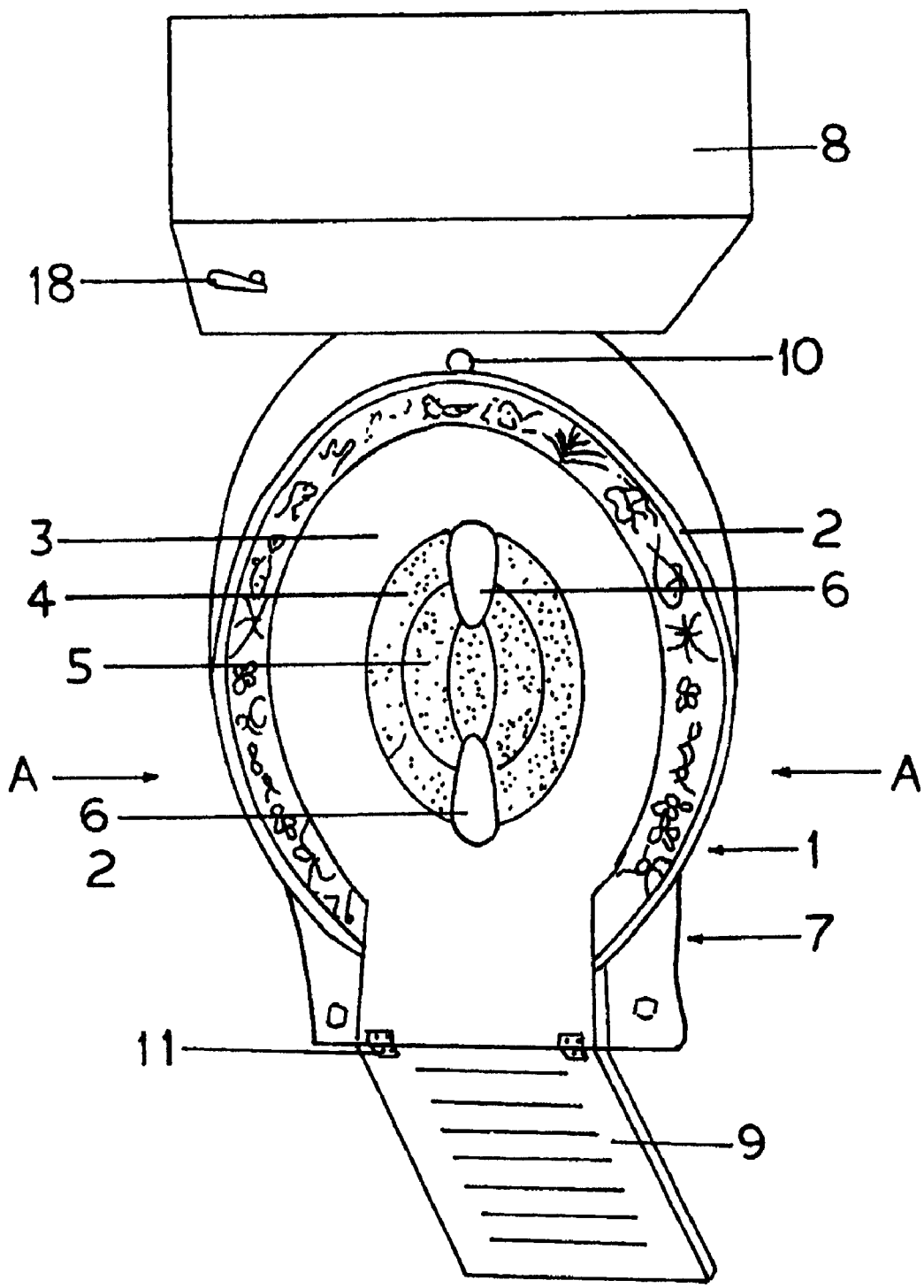
FIG. 1 is a top elevation view of the flush toilet according to the present invention.

As shown in FIG. 1, a standing board 1 is located on top of a conventional flush toilet in order that it may be used by a domestic pet such as a cat or dog. The standing board 1 is provided with a surrounding upright fencing wall 2 at its left, rear and right sides so as to provide privacy and protection for the pet. The top of the standing board 1 has a flat platform 3 having a stepped portion 4 surrounding the center opening of the standing board 1. The stepped portion 4 has various widths adapted to accommodate pets of various body sizes to crouch on the standing board 1 comfortably during use with its left leg and right leg standing on two selected opposite sides of these steps and it has a relatively small inner step 5 designed for use by a kitten. The pet's excrement passes through the center opening 6 of the standing board to fall into the toilet bowl 7. The top surface of the stepped portion 4 of the standing board 1 is provided with a plastic top coating which may have a sand particle texture. The toilet has a water tank 8 for holding the flush water. A sloping ramp 9 is provided to facilitate the pet from getting on or off the standing board 1. A training ring 10 is located at the rear of the standing board 1 and is mounted at a fixed distance to the fencing wall 2 with a leather belt which may be operated by the pet for releasing the flushing water for disposing the excrement in the toilet 7 such that it trains the pet to use the toilet. The sloping ramp 9 is mounted to the platform by hinges 11.

Figure 2:
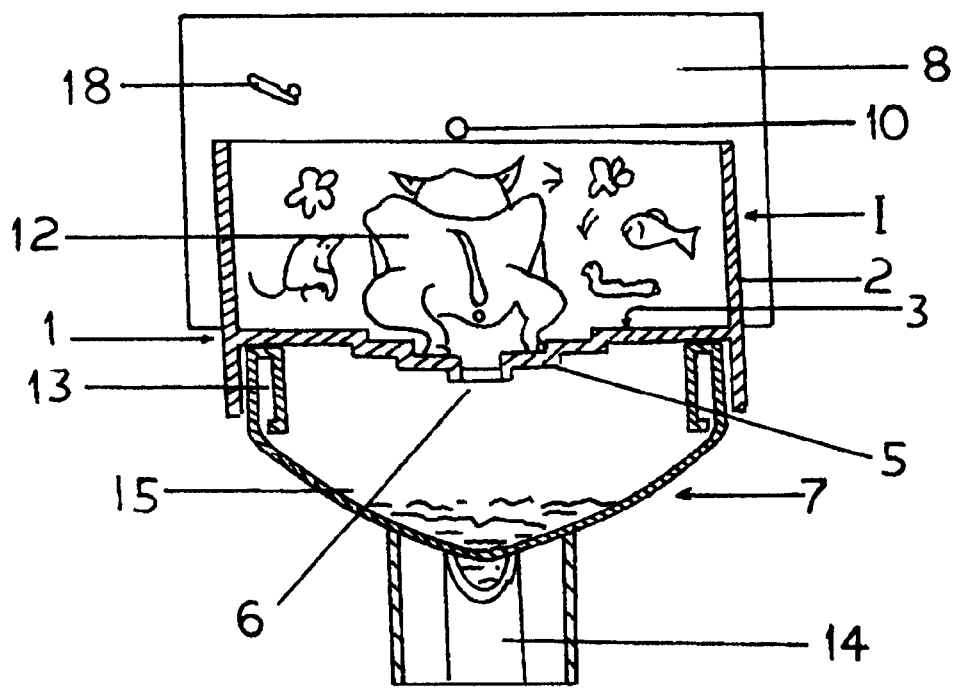
FIG. 2 is a front elevation view along section line A—A of FIG. 1.
Figure 3:
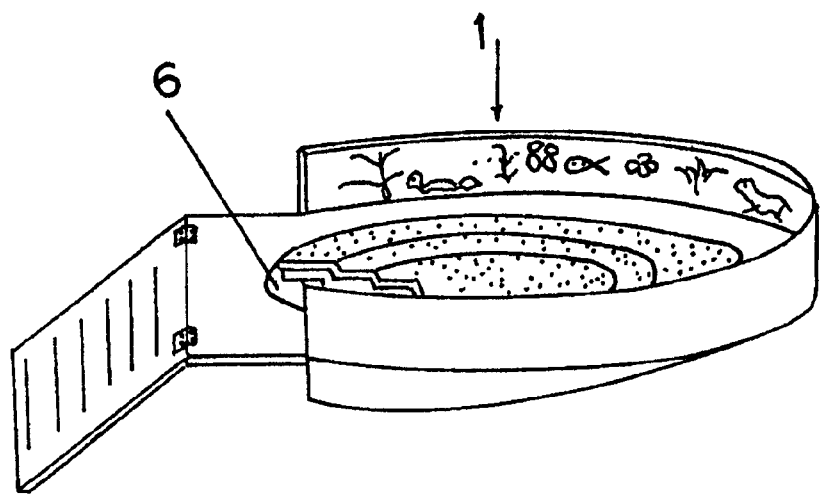
FIG. 3 is a perspective side elevation view of the stepped standing board of the toilet.

As shown in FIG. 2 a cat 12 crouches on the standing board 1. The toilet has a flushing duct 13 and a drain 14. The excrement falls directly into the water pool 15 in the toilet during use.

Figure 4:
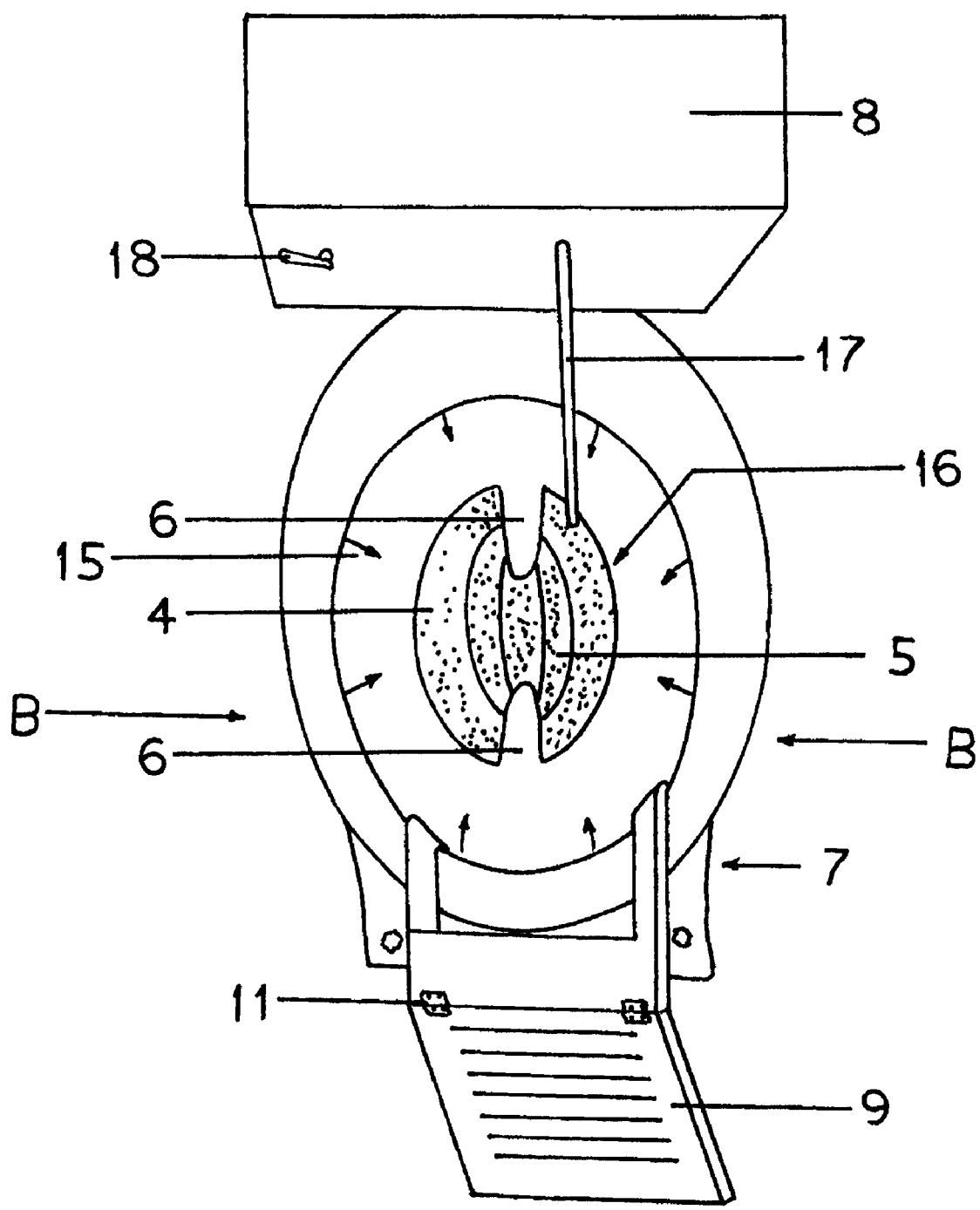
FIG. 4 is a top elevation view of an alternative embodiment of the standing board of the toilet according to the present invention.
Figure 5:
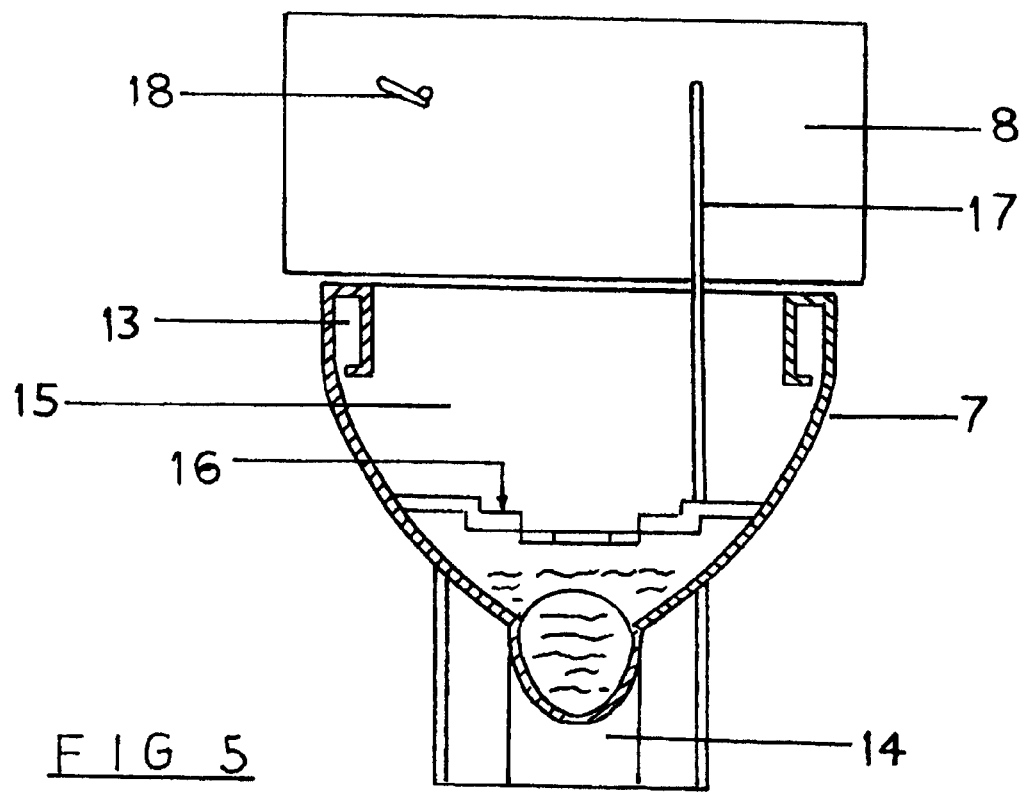
FIG. 5 is a sectional front elevation view along section line B—B of FIG. 4.
Figure 6:
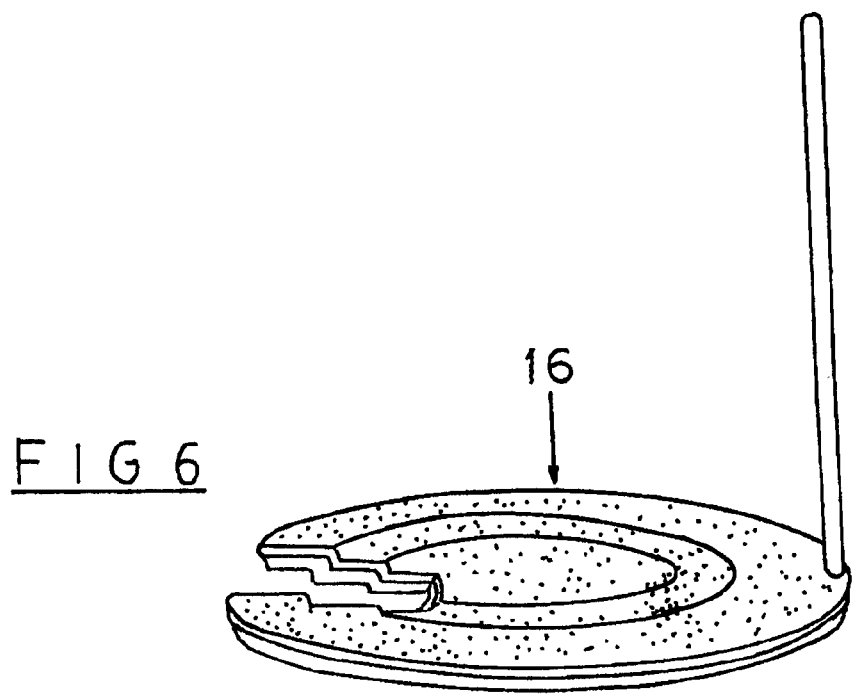
FIG. 6 is a perspective side elevation view of the inside standing board.

An alternative embodiment is shown in FIG. 4 in which an inside standing board 16 similar to standing board 1 but smaller in size and dimension so that it may be positioned within the toilet bowl 7 by merely resting on the side wall of the toilet bowl. The inside standing board 16 is provided with an upstanding handle rod 17 which may be used for removing or placing the inside standing board 16 in or from the toilet bowl easily. As best shown in FIG. 5 the inside standing board 16 is located just above the ambient water 15 in the toilet bowl. The flushing water will rise above the inside standing board 16 to clean its top surface of any excrement and washes it into the bowl and subsequently disposing it through the drain 14.

The water tank is provided with a conventional horizontal operating handle 18 which may be operated to flush the toilet in a conventional manner.

The standing board 1 and inside standing board 16 may be integrally formed on or in the toilet of various shapes.

Figure 7:
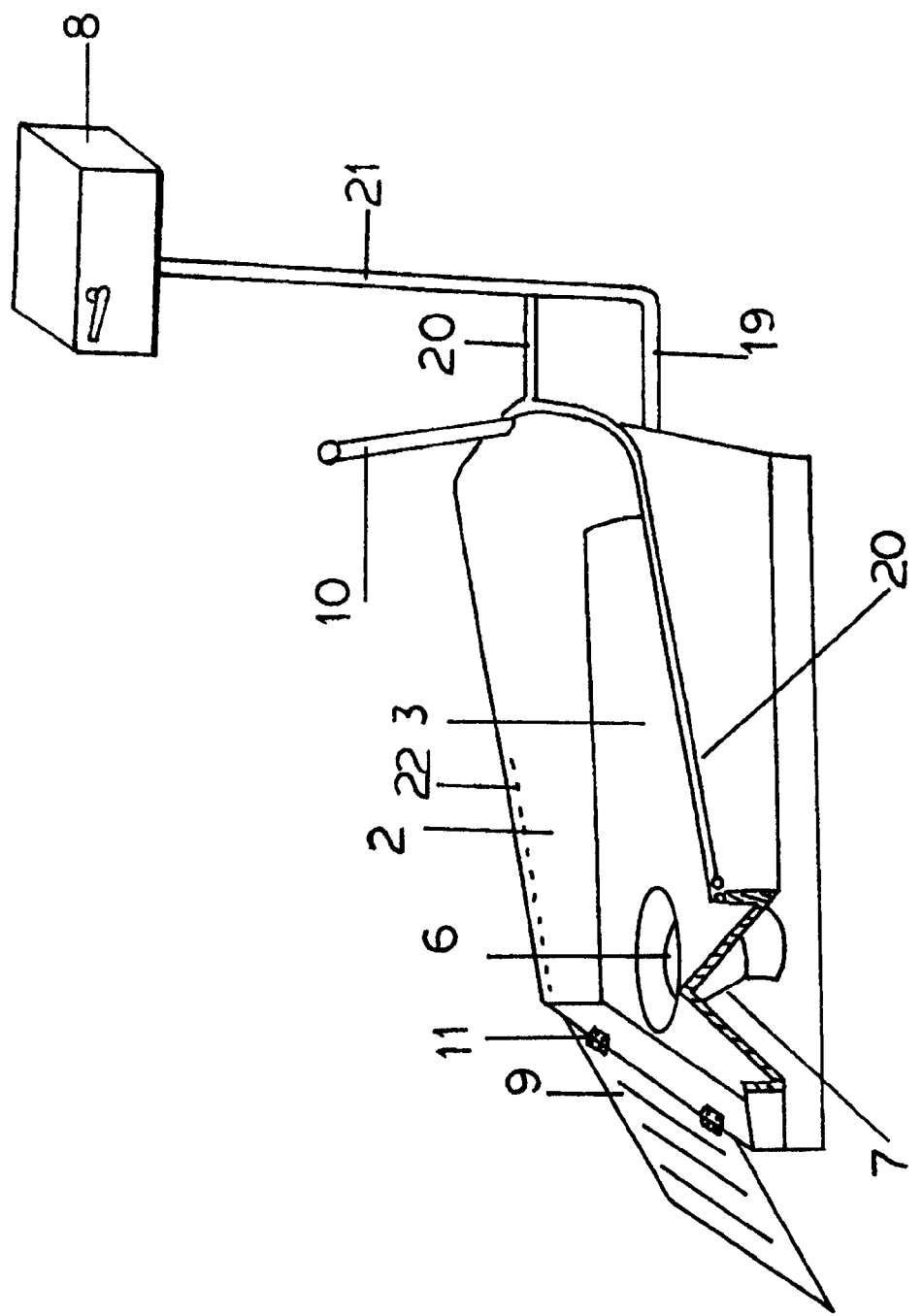
FIG. 7 is a perspective side elevation view showing a flush toilet for use by a relatively larger size dog.

A flush toilet for use by a relatively larger size dog is shown in FIG. 7. The toilet has water pipes 19 and 20. The water pipe 20 is for conducting water to the outlet openings 21 for cleaning the side walls of the toilet with flushing water.

As described above it can be understood by those skilled in the art that the flush toilet of the present invention provides a convenient means for disposing the excrements of a domestic pet in a sanitary manner as in a conventional flush toilet used by human so as to maintain the sanitary condition inside the house.

What I claim is:

1. A device adaptable to a flush toilet for use by a cat, comprising
   a platform adapted for mounting on said flush toilet,
   a stepped standing board portion located at a center portion of said platform and operative for a cat to crouch comfortably therein for releasing excrement,
   an opening formed in said stepped standing board portion and operative for said excrement to drop therethrough into said flush toilet, said stepped standing board portion including a series of surrounding steps having various widths adapted to accommodate pets of various sizes to crouch on said stepped standing board portion with a left leg and a right leg standing on two opposite sides of said steps respectively.

2. A device according to claim 1 wherein said stepped standing board portion has a top surface with a plastic coating applied thereon, said plastic coating having a sand particle texture.

3. A device according to claim 2 including an upright fencing wall surrounding a front portion, left portion and right portion of said stepped standing board portion, a training ring mounted at a fixed distance to said fencing wall with a leather belt and adapted for training a pet in using said toilet.

4. A device according to claim 1 wherein said platform has a size adaptable to be located within a bowl portion of said flush toilet with edges of said platform merely resting against side walls of said bowl portion, said bowl portion having an ambient water level therein and said platform being located just above said water level, and a single upstanding handle rod extending upwards from said stepped standing board and operative for removing and placing said platform from said bowl portion of said flush toilet.

* * * * *